US012246890B2

(12) United States Patent
Nagel et al.

(10) Patent No.: US 12,246,890 B2
(45) Date of Patent: Mar. 11, 2025

(54) METHOD FOR THE PRODUCTION OF AN ECO-BOWL

(71) Applicant: DS SMITH PACKAGING DEUTSCHLAND STIFTUNG & CO. KG, Erlensee (DE)

(72) Inventors: Andreas Nagel, Großenlüder (DE); Rüdiger Lindner, Dormagen (DE)

(73) Assignee: DS SMITH PACKAGING DEUTSCHLAND STIFTUNG & CO. KG, Erlensee (DE)

( * ) Notice: Subject to any disclaimer, the term of this patent is extended or adjusted under 35 U.S.C. 154(b) by 0 days.

(21) Appl. No.: 18/002,894

(22) PCT Filed: Jun. 22, 2021

(86) PCT No.: PCT/EP2021/066928
§ 371 (c)(1),
(2) Date: Dec. 22, 2022

(87) PCT Pub. No.: WO2021/259904
PCT Pub. Date: Dec. 30, 2021

(65) Prior Publication Data

US 2023/0211917 A1 Jul. 6, 2023

(30) Foreign Application Priority Data

Jun. 24, 2020 (DE) ..................... 10 2020 116 617.6

(51) Int. Cl.
*B65D 5/24* (2006.01)
*B31B 50/26* (2017.01)
(Continued)

(52) U.S. Cl.
CPC .............. *B65D 5/243* (2013.01); *B31B 50/26* (2017.08); *B31B 50/622* (2017.08);
(Continued)

(58) Field of Classification Search
CPC ........ B65D 5/243; B65D 5/2047; B65D 5/28; B65D 77/2024; B65D 2577/2025;
(Continued)

(56) References Cited

U.S. PATENT DOCUMENTS 3,316,102 A * 4/1967 Doll ..................... B65D 5/2033 229/116
4,257,530 A * 3/1981 Faller ......................... B65B 9/04 229/905
(Continued)

FOREIGN PATENT DOCUMENTS

GB 1436205 A 5/1976
WO 2016181015 A1 11/2016

OTHER PUBLICATIONS

International Search Report for International Patent Application No. PCT/EP2021/066928, mailed Sep. 24, 2021.

*Primary Examiner* — Christopher R Demeree
(74) *Attorney, Agent, or Firm* — Armstrong Teasdale LLP

(57) ABSTRACT

A method for producing a bowl formed by a tray closed by a sealing film involves preparing a blank where a first and a second couples of crease lines delimit a bottom panel, two first and two second side walls, each first side wall provided of an internal flap and an external flap delimited by respective third and fourth crease lines, each second side wall provided of an internal flap and an external flap delimited by respective fifth and sixth crease lines, erecting the blank into a tray, folding the internal and external flaps of each first side wall about the respective third crease line and the internal and external flaps of each second side wall about the respective fifth crease line, applying adhesive on the internal and/or external flaps of each first and second side walls, folding the external flap of each first side wall about the respective fourth crease line and the external flap of each second side wall about the respective sixth crease line,
(Continued)

forming a rim, applying adhesive on gaps between abutting ends of rims of adjacent first and second side walls, and attaching the sealing film on the rims.

8 Claims, 5 Drawing Sheets

(51) Int. Cl.

| | |
|---|---|
| ***B31B 50/62*** | (2017.01) |
| ***B31B 100/00*** | (2017.01) |
| ***B31B 110/10*** | (2017.01) |
| ***B31B 110/35*** | (2017.01) |
| ***B31B 120/00*** | (2017.01) |
| ***B31B 120/10*** | (2017.01) |
| ***B65D 5/20*** | (2006.01) |
| ***B65D 5/28*** | (2006.01) |

(52) U.S. Cl.
CPC ............. *B65D 5/2047* (2013.01); *B65D 5/28* (2013.01); *B31B 2100/0024* (2017.08); *B31B 2110/10* (2017.08); *B31B 2110/35* (2017.08); *B31B 2120/002* (2017.08); *B31B 2120/10* (2017.08)

(58) Field of Classification Search
CPC ........ B65D 5/246; B65D 5/248; B65D 5/443; B31B 50/26; B31B 50/622; B31B 2100/0024; B31B 2110/10; B31B 2110/35; B31B 2120/002; B31B 2120/10; B31B 50/00; B65B 7/164; B65B 9/04
USPC ........ 229/186, 113, 116, 125.35, 176, 185.1, 229/407; 206/525, 484
See application file for complete search history.

(56) References Cited

U.S. PATENT DOCUMENTS 5,356,070 A * 10/1994 Rigby ................ B65D 5/48022 229/407
11,691,778 B2 * 7/2023 Zwaga .................. B65D 5/243 229/113

* cited by examiner

METHOD FOR THE PRODUCTION OF AN ECO-BOWL

CROSS-REFERENCE TO RELATED APPLICATION

This application is a National Stage Application of International Patent Application No. PCT/EP2021/066928, having an International Filing Date of Jun. 22, 2021, which claims priority to German Patent Application No. 10 2020 116 617.6, filed Jun. 24, 2020, the entire contents of which are incorporated by reference herein.

FIELD OF THE INVENTION

The present invention relates to a method for the production of a bowl formed by a tray closed by a sealing film and the bowl obtainable thereby.

BACKGROUND OF THE INVENTION

It is known producing such a bowl by folding a cardboard or corrugated board blank in order to form a tray having a bottom panel and a side wall, and attaching the plastic sealing film on a flange protruding from the top edge of the side wall.

Such a bowl is thus formed by a major part of cardboard or corrugated board and a minor part of plastic material, which can be easily separated after use and thus subjected to distinct recycling procedures with a substantially integral recovery of the initial raw materials.

One object of the present invention is improving the known methods of productions of such bowls.

SUMMARY OF THE INVENTION

According to the present invention, this object is achieved by means of a production method comprising the steps of:

- preparing a blank wherein a first couple of parallel crease lines and a second couple of parallel crease lines intersecting, and preferably orthogonal to, the first couple of crease lines delimit a bottom panel, two first side walls opposite to each other and two second side walls opposite to each other, each first side wall being provided of an internal flap and an external flap which are delimited by respective third and fourth crease lines parallel to the first crease lines, each second side wall being provided of an internal flap and an external flap which are delimited by respective fifth and sixth crease lines parallel to the second crease lines,
- erecting the blank into a tray by folding the first side walls about the respective first crease lines and the second side walls about the respective second crease lines,
- folding the internal flap and the external flap of each first side wall about the respective third crease line and the internal flap and the external flap of each second side wall about the respective fifth crease line, so that said flaps are parallel to the bottom panel,
- applying adhesive on at least one of said internal and external flap of each first and second side wall,
- folding the external flap of each first side wall about the respective fourth crease line and the external flap of each second side wall about the respective sixth crease line, so that each external flap adheres to the respective internal flap, forming a rim protruding outwards from the edge of each side wall and parallel to the bottom panel,
- applying adhesive on gaps between abutting ends of the rims of adjacent first and second side walls, so that said gaps are filled and sealed, and
- attaching the sealing film on said rims, so that said sealing film closes the tray.

Preferred features of the method of the present invention are also described.

A further subject-matter of the present invention is constituted by a bowl obtainable by the above disclosed production method.

According to the invention, the obtained tray is provided of very stiff rims having a thickness which is twice the one of the blank, and thus allowing the adoption of high speed sealing procedures for the application thereon of the sealing film. Hence, the process time is meaningfully reduced.

Furthermore, the application of the adhesive seals the gaps existing abutting ends of the rims of adjacent first and second side walls, so that the tightness of the sealing is increased.

The increased stiffness of the rims provides the additional advantage of allowing, if suitable, the use of the standard screw de-nesters which are conventionally used for handling the common plastics trays. Of course, even dedicated equipment may be used, if requested by the circumstances.

BRIEF DESCRIPTION OF THE FIGURES

Further advantages and features of the present invention will be apparent from the following detailed description, given by way of non-limiting example with reference to the appended drawings, in which.

DETAILED DESCRIPTION

Figure 1:
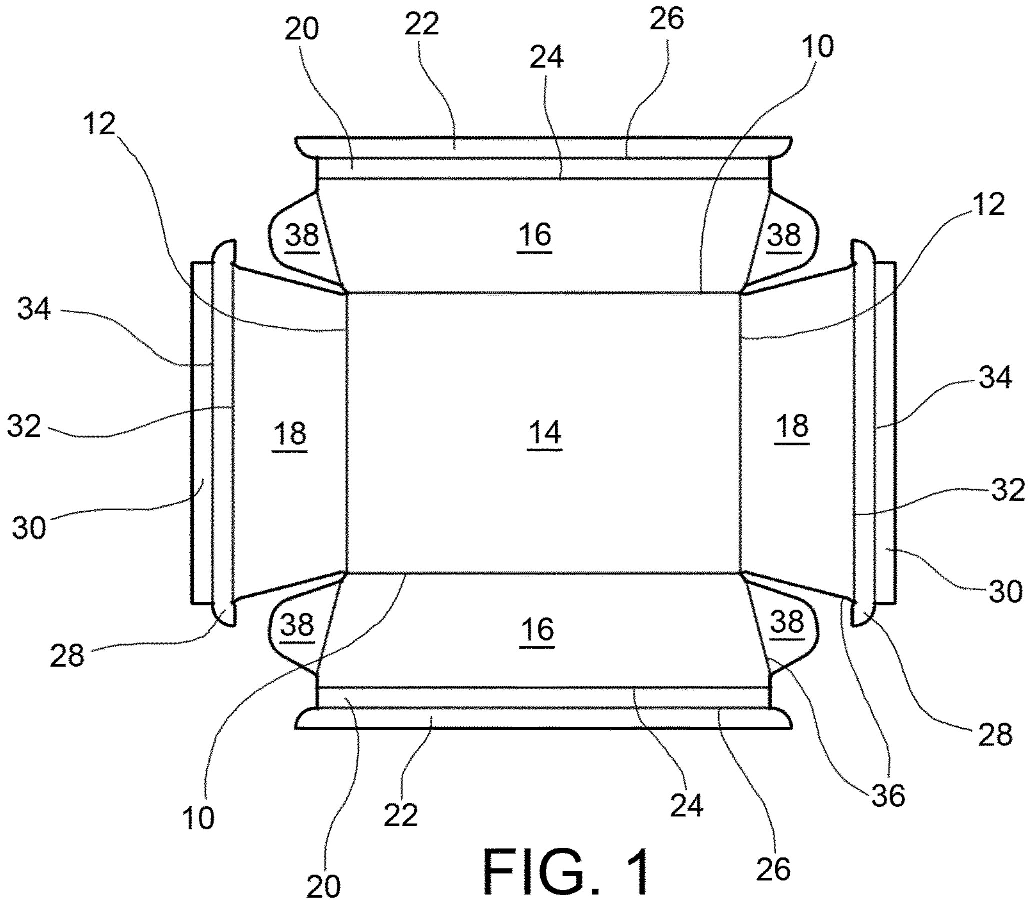
FIG. 1 is plan view of a blank used in the method according to the invention.

FIG. 1 illustrates a cardboard or corrugated board blank wherein a first couple of parallel crease lines 10 and a second couple of parallel crease lines 12 orthogonal to the first couple of crease lines 10 delimit a bottom panel 14, two first side walls 16 opposite to each other and two second side walls 18 opposite to each other.

Each first side wall 16 is provided of an internal flap 20 and an external flap 22 which are delimited by respective third 24 and fourth 26 crease lines parallel to the first crease lines 10. It is pointed out that the qualifications “external” and “internal” are solely referred to the fully unfolded blank in flat configuration.

Each second side wall 18 is provided of an internal flap 28 and an external flap 30 which are delimited by respective fifth 32 and sixth 34 crease lines parallel to the second cease lines 12. Even in this case, the qualifications “external” and “internal” are solely referred to the fully unfolded blank in flat configuration.

The bottom panel 14 is substantially rectangular, taking into account that, in the absence of any specific indication to the contrary, any reference to "rectangular" in the present description includes the particular case of "square".

The side walls 16, 18 are trapezoidal and have a minor base attached to the bottom panel 14, a major base attached to the respective internal flap 20, 28, and oblique sides 36. Respective wings 38 protrude from the oblique sides 36 of the first side walls 16. The external flaps 22 of the first side walls 16 and the internal flaps 28 of the second side walls 18 laterally extend beyond the respective major base.

Figure 2:
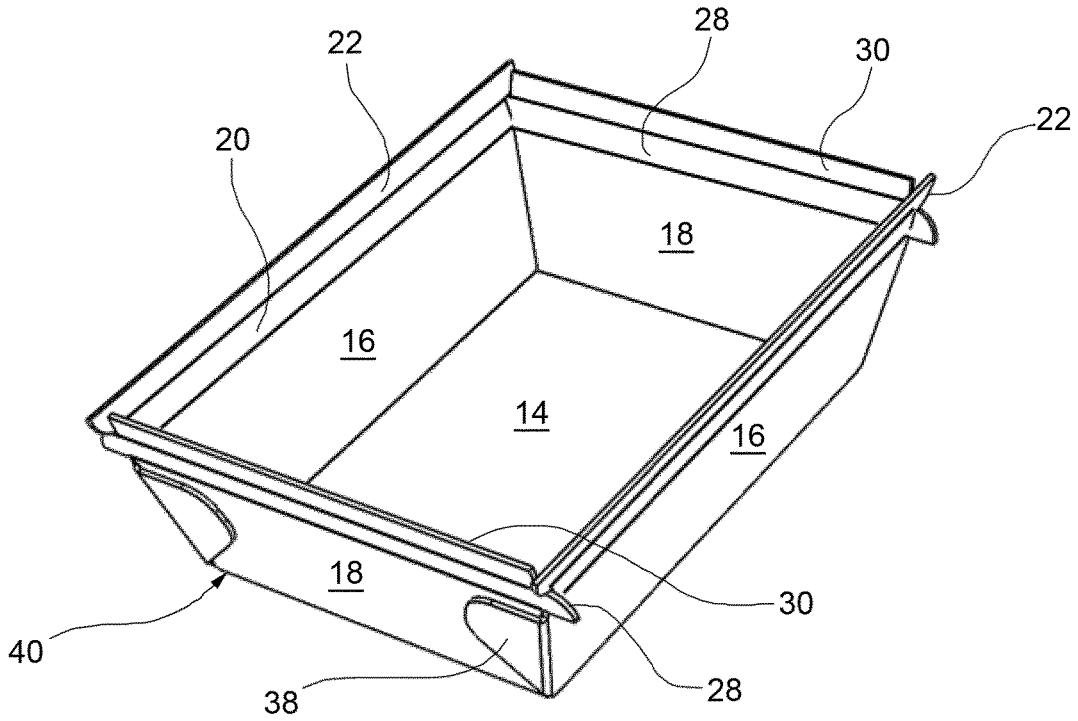
FIG. 2 is a perspective view of tray obtained by erecting the blank FIG. 1 according to the method of the invention.

The above-disclosed blank is erected into a tray (FIG. 2) by folding the first side walls 16 about the respective first crease lines 10 and the second side walls 18 about the respective second crease lines 12, and by gluing the folded wings 38 to the respective adjacent second side wall 18. In this configuration, the side walls 16, 18 are slightly inclined in respect of a vertical plane and the oblique sides 36 of adjacent first and second side walls 16, 18 are abutting. The end portions of the external flaps 22 of the first side walls 16 and the internal flaps 28 of the second side walls 18 slightly protrude outwards beyond the respective side wall 16, 18.

Figure 3:
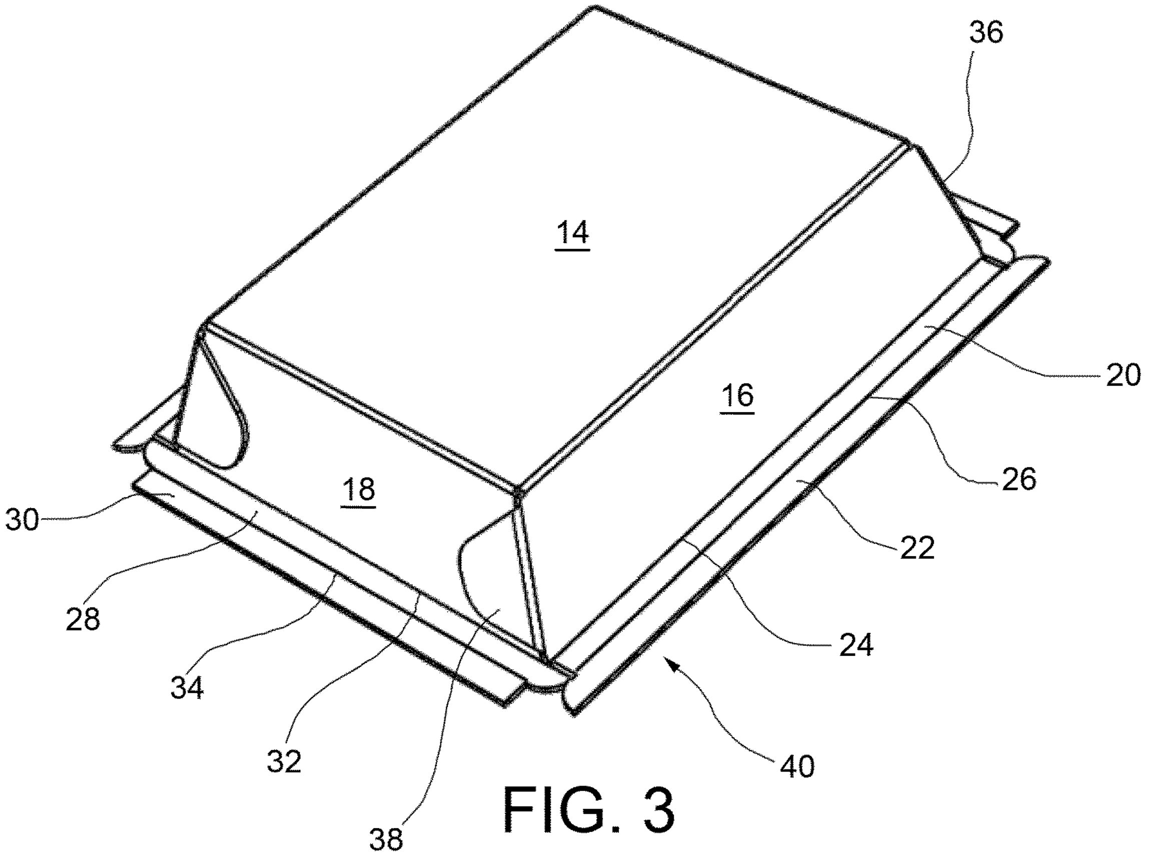
FIGS. 3 and 4 are perspective views of the tray in respective successive steps of the method of the invention.

Successively, (FIG. 3) the internal flap 20 and the external flap 22 of each first side wall 16 are folded about the respective third crease line 24 and the internal flap 28 and the external flap 30 of each second side wall 18 are folded about the respective fifth crease line 32, so that the flaps 20, 22, 26, 28 lie horizontally and are parallel to the bottom panel 14. Such arrangement may be obtained by exercising a pressure on the bottom panel 14, when the internal cavity of the tray 40 is directed downwards, as illustrated in FIG. 3.

Figure 4:
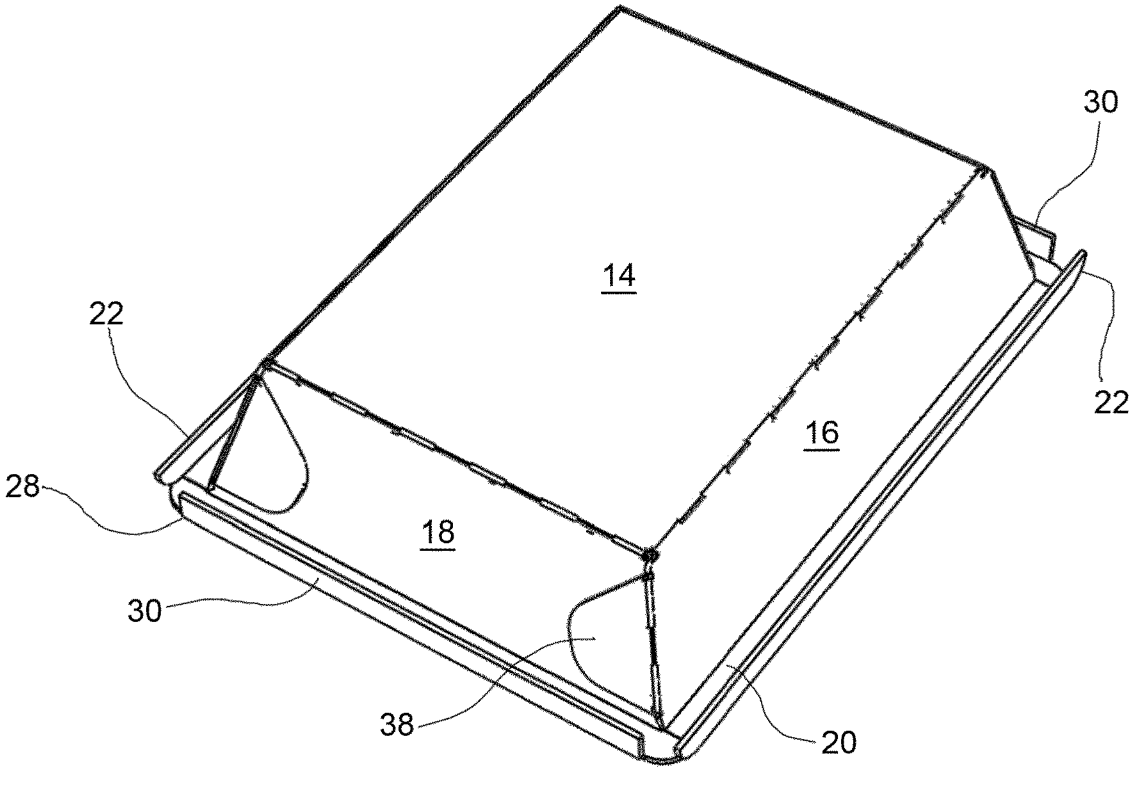

Then, (FIG. 4) the external flap 22 of each first side wall 16 is folded about the respective fourth crease line 26 and the external flap 30 of each second side wall 18 is folded about the respective sixth crease line 34, so that each external flap 22, 30 is arranged in a substantially vertical configuration.

Figure 5:
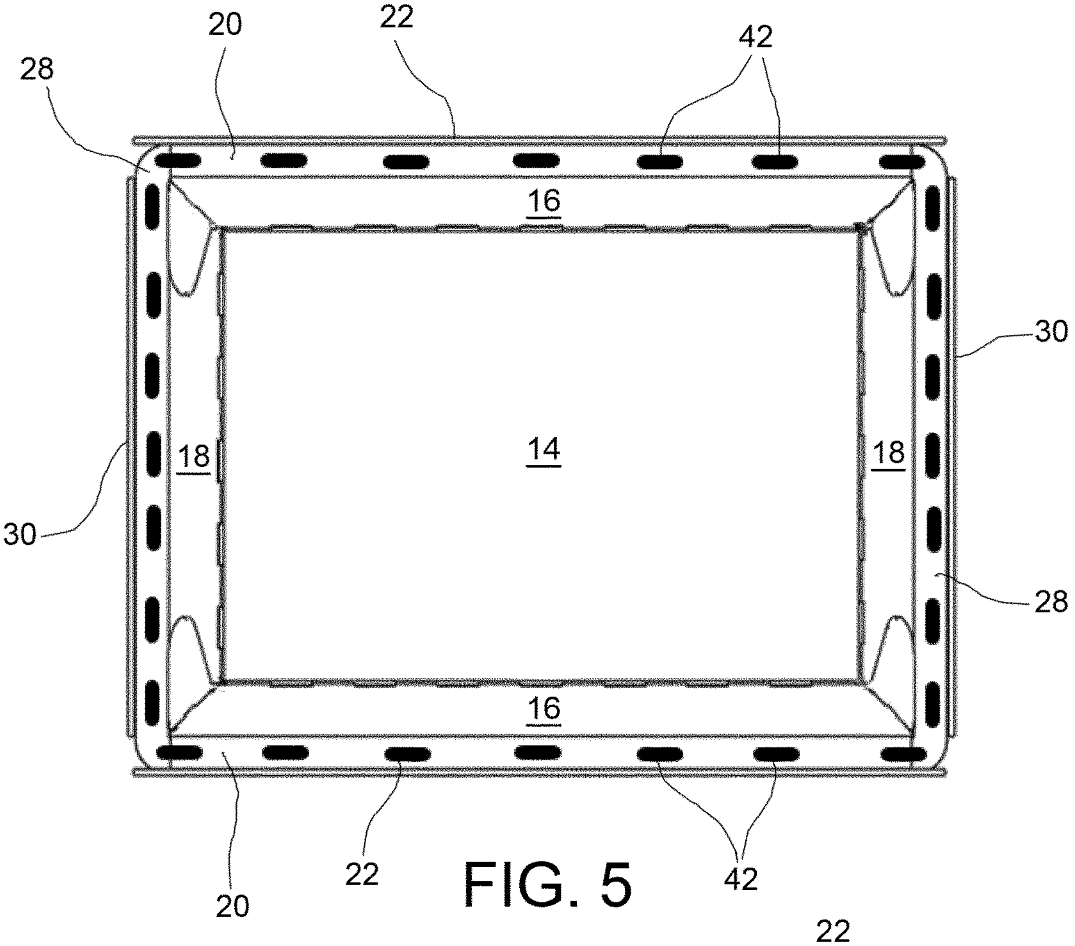
FIGS. 5 and 6 are plan view from the bottom of the of the tray in respective successive steps of the method of the invention.

While the external flaps 22, 30 are in this configuration, an adhesive, e.g. a hot-melt adhesive, is applied on the face directed upwards of the internal flaps 20, 28 which lie horizontally in the form of lines of distanced dots 42 (FIG. 5).

Figure 6:
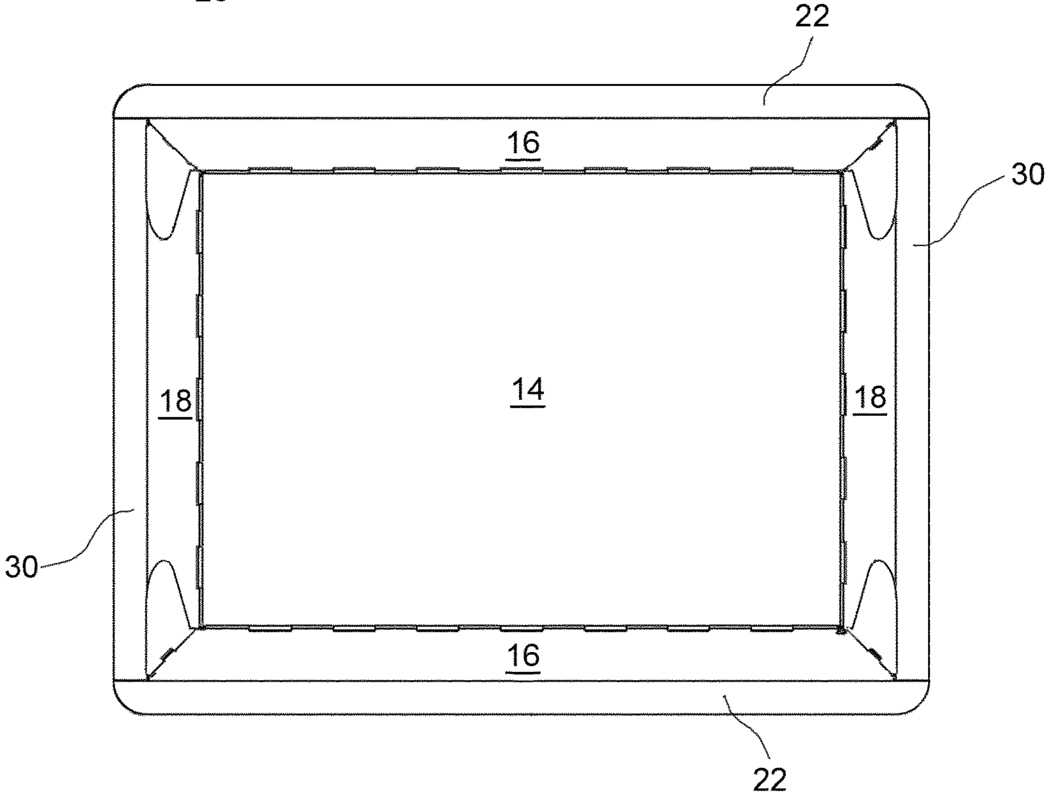
Figure 7:
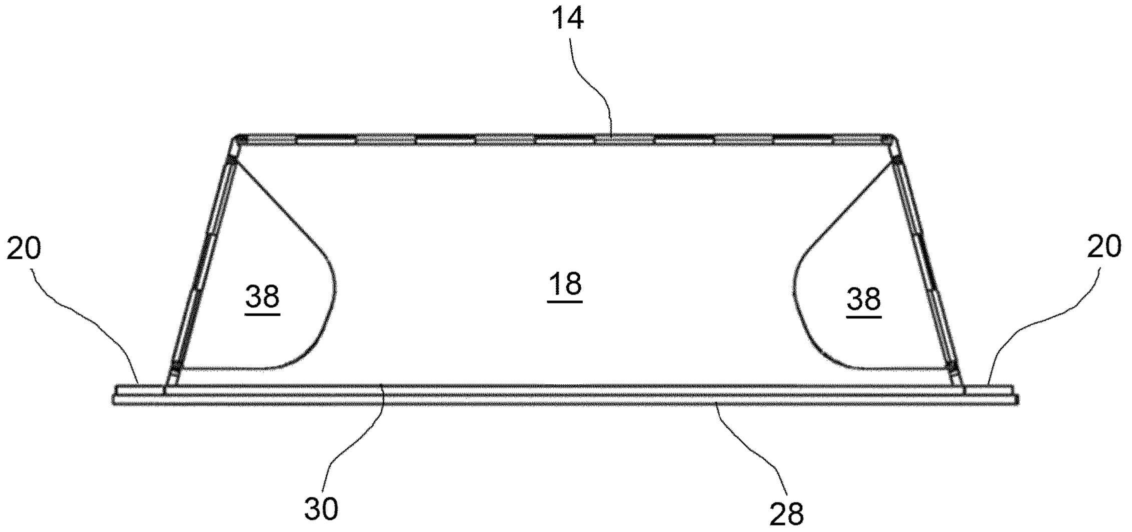
FIG. 7 is an elevation side view of the tray of FIG. 6, FIGS. 8 and 9 are perspective views of the tray in respective successive steps of the method of the invention.

Afterwards, (FIGS. 6 and 7) the external flap 22 of each first side wall 16 is folded about the respective fourth crease line 26 and the external flap 30 of each second side wall 18 is folded about the respective sixth crease line 34, so that each external flap 22, 30 adheres to the respective internal flap 20, 28, forming a rim protruding outwards from the edge of each side wall 16, 18, and parallel to the bottom panel 14. The rims are thus completely sealed and ensure optimal tightness.

Figure 8:
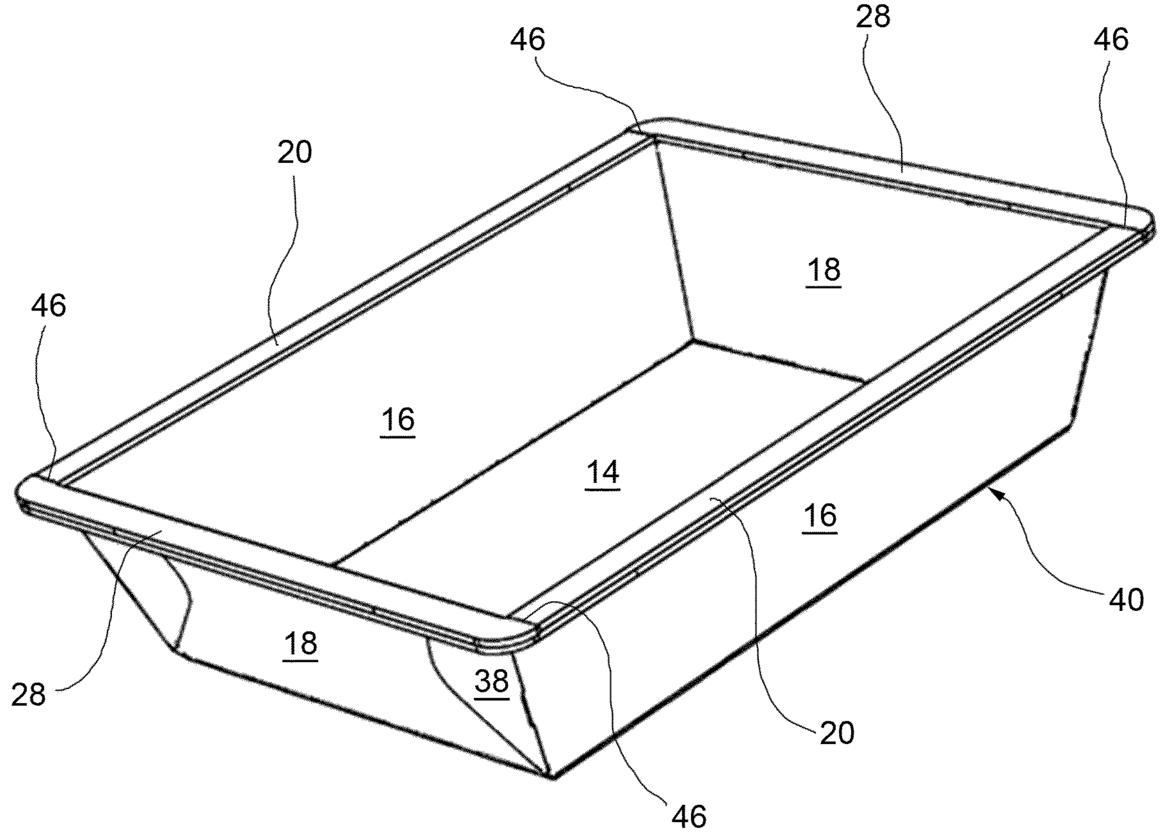
Figure 9:
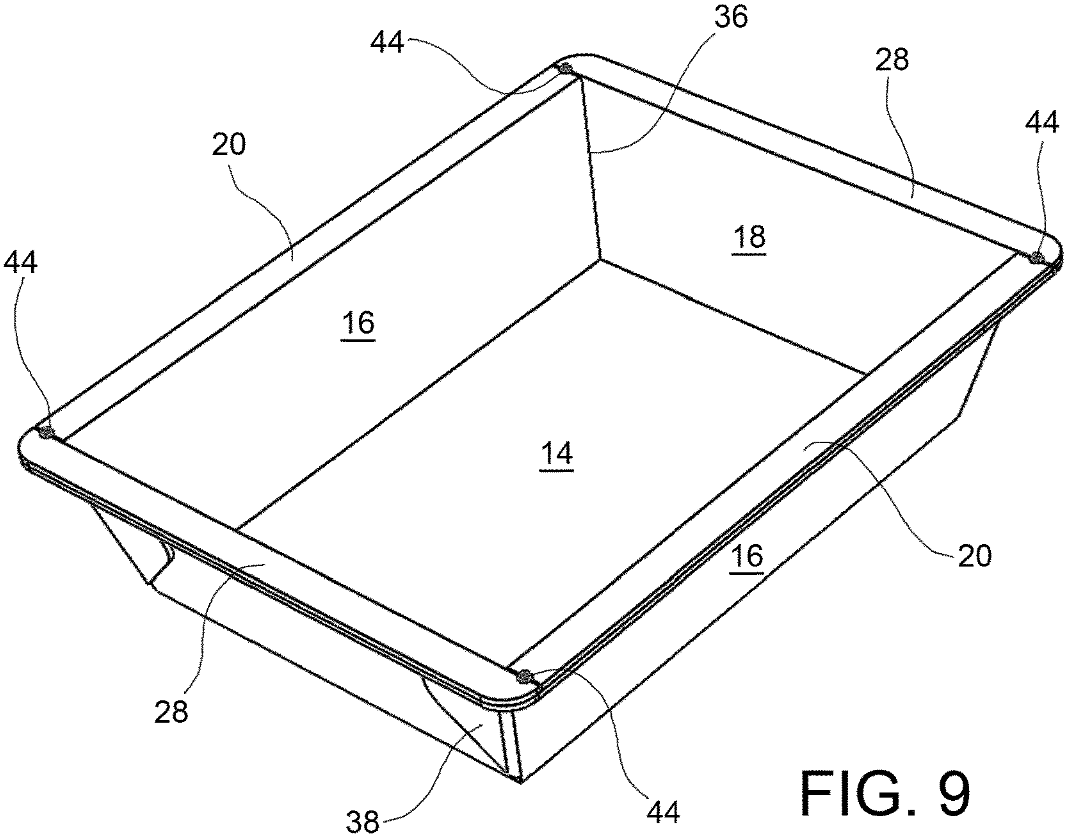
Figure 10:
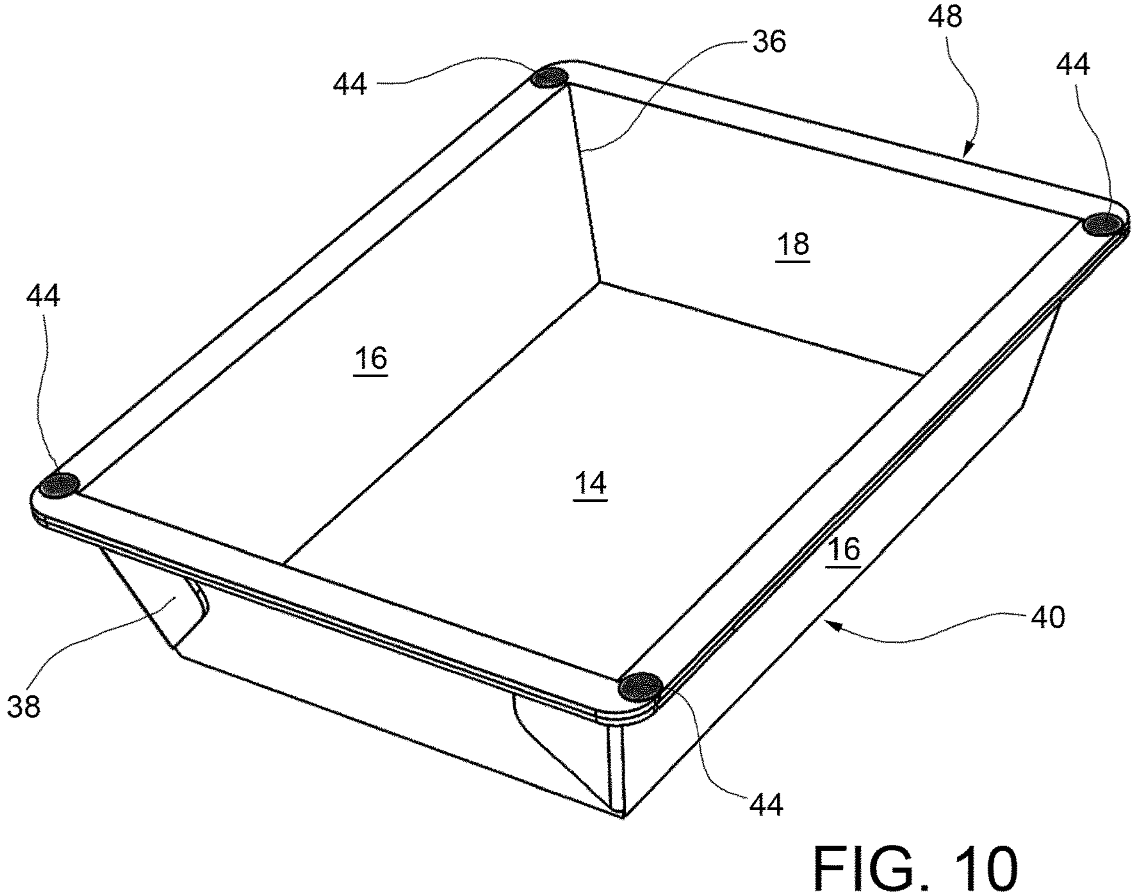
FIG. 10 is a perspective view of the bowl obtained by the method of the invention.

The tray 40 is then turned upside down, so that its internal cavity is directed upwards, as illustrated in FIG. 8, and (FIG. 9) patches 44 of adhesive, e.g. a hot-melt adhesive, are applied on corner gaps 46 between abutting ends of the rims of adjacent first and second side walls 16, 18, so that these gaps 46 are tightly sealed avoiding any possible leak therethrough in reference to a successively applied plastic film sealing (e.g. a thermoformed film with a top film).

It must be noticed that the rims—formed by gluing together superposed internal 20, 28 and external 22, 30 flaps—have a thickness which is twice the thickness of the blank, so that they are quite stiff. Hence, a pile of nested trays 40 may be handled by screw de-nesters which are typically used for de-nesting conventional plastics trays, without requiring dedicated equipment. Of course, dedicated equipment may also be used for handling the trays 40.

Finally, once the internal cavity of the tray 40 has been filled with the desired products (not shown in the figures), a plastic sealing film 48 is attached, e.g. by conventional techniques of thermal welding, on the upper face of the rims. Hence, the film 48 closes the internal cavity of the tray 40, and the final bowl is obtained.

After use, the cardboard tray 40 can be easily separated from the plastic film 48, so that the initial raw materials can be substantially integrally recycled.

Naturally, the principles of the invention remaining the same, the details of construction and embodiments may be widely varied with respect to those described purely by way of example, without thereby departing from the claimed scope.

What is claimed is:

1. A method for producing a bowl formed by a cardboard or corrugated board tray closed by a sealing film, said method comprising:

preparing a blank wherein a first couple of parallel crease lines and a second couple of parallel crease lines intersecting the first couple of parallel crease lines delimit a bottom panel, two first side walls opposite to each other and two second side walls opposite to each other, each first side wall being provided of an internal flap and an external flap delimited by respective third and fourth crease lines parallel to the first crease lines, each second side wall being provided of an internal flap and an external flap delimited by respective fifth and sixth crease lines parallel to the second crease lines, erecting the blank into a tray by folding the first side walls about the respective first crease lines and the second side walls about the respective second crease lines, folding the internal flap and the external flap of each first side wall about the respective third crease line and the internal flap and the external flap of each second side wall about the respective fifth crease line, so that the internal and external flaps of each first and second side walls lie horizontally and are parallel to the bottom panel, applying adhesive on at least one of said internal and external flaps of each first and second side walls, folding the external flap of each first side wall about the respective fourth crease line and the external flap of each second side wall about the respective sixth crease line, so that each external flap adheres to the respective internal flap, forming a rim protruding outwards from an edge of each first and second side walls and parallel to the bottom panel, applying adhesive on gaps between abutting ends of rims of adjacent first and second side walls, so that the gaps are filled and sealed, and attaching the sealing film on said rims, so that said sealing film closes the tray, said method further comprising, prior to applying the adhesive on the internal flaps of the first and second side walls, folding the horizontally lying external flap of each first side wall about the respective fourth crease line and the horizontally lying external flap of each second side wall about the respective sixth crease line, so that each external flap is arranged in a substantially vertical configuration.

2. The method of claim 1, wherein said bottom panel is substantially rectangular, and said first and second side walls are trapezoidal and have a minor base attached to the bottom panel and a major base attached to the respective internal flap, and wherein the external flaps of the first side walls and the internal flaps of the second side walls laterally extend beyond the respective major base.

3. The method of claim 2, wherein respective wings protrude from oblique sides of the first side walls, so that after the erecting step said wings are folded and glued to the respective adjacent second side wall.

4. The method of claim 1, wherein said adhesive is a hot-melt adhesive.

5. The method of claim 1, wherein said adhesive is applied on said internal and/or external flaps in the form of lines of distanced dots.

6. The method of claim 1, the method further comprising turning upside down said tray after forming said rims.

7. The method of claim 1, wherein said sealing film is attached to said rims by thermal welding.

8. A bowl formed by a cardboard or corrugated board tray closed by a sealing film, and obtainable by a method comprising:

preparing a blank wherein a first couple of parallel crease lines and a second couple of parallel crease lines intersecting the first couple of parallel crease lines delimit a bottom panel, two first side walls opposite to each other and two second side walls opposite to each other, each first side wall being provided of an internal flap and an external flap delimited by respective third and fourth crease lines parallel to the first crease lines, each second side wall being provided of an internal flap and an external flap delimited by respective fifth and sixth crease lines parallel to the second crease lines, erecting the blank into a tray by folding the first side walls about the respective first crease lines and the second side walls about the respective second crease lines, folding the internal flap and the external flap of each first side wall about the respective third crease line and the internal flap and the external flap of each second side wall about the respective fifth crease line, so that the internal and external flaps of each first and second side walls lie horizontally and are parallel to the bottom panel, applying adhesive on at least one of said internal and external flaps of each first and second side walls, folding the external flap of each first side wall about the respective fourth crease line and the external flap of each second side wall (about the respective sixth crease line, so that each external flap adheres to the respective internal flap, forming a rim protruding outwards from an edge of each first and second side walls and parallel to the bottom panel, applying adhesive on gaps between abutting ends of rims of adjacent first and second side walls, so that the gaps are filled and sealed, and attaching the sealing film on said rims, so that said sealing film closes the tray, said method further comprising, prior to applying adhesive on the internal flaps of the first and second side walls, folding the horizontally lying external flap of each first side wall about the respective fourth crease line and the horizontally lying external flap of each second side wall about the respective sixth crease line, so that each external flap is arranged in a substantially vertical configuration, wherein the rims of said tray are formed by gluing together superposed internal and external flaps and wherein the qualifications "external" and "internal" are referred to the fully unfolded blank in flat configuration.

* * * * *